United States Patent
Fujii

(10) Patent No.: US 10,153,471 B2
(45) Date of Patent: Dec. 11, 2018

(54) LITHIUM ION SECONDARY BATTERY

(71) Applicant: Automotive Energy Supply Corporation, Zama-Shi, Kanagawa (JP)

(72) Inventor: Takayuki Fujii, Zama (JP)

(73) Assignee: Automotive Energy Supply Corporation, Zama-Shi (JP)

(*) Notice: Subject to any disclaimer, the term of this patent is extended or adjusted under 35 U.S.C. 154(b) by 210 days.

(21) Appl. No.: 15/171,058

(22) Filed: Jun. 2, 2016

(65) Prior Publication Data

US 2017/0005308 A1 Jan. 5, 2017

(30) Foreign Application Priority Data

Jun. 30, 2015 (JP) ................................. 2015-131990

(51) Int. Cl.
*H01M 2/16* (2006.01)
*H01M 4/505* (2010.01)
*H01M 4/525* (2010.01)
*H01M 10/0525* (2010.01)
*H01M 10/0567* (2010.01)
*H01M 10/42* (2006.01)

(52) U.S. Cl.
CPC ......... *H01M 2/166* (2013.01); *H01M 2/1686* (2013.01); *H01M 4/505* (2013.01); *H01M 4/525* (2013.01); *H01M 10/0525* (2013.01); *H01M 10/0567* (2013.01); *H01M 10/4235* (2013.01); *H01M 2300/0037* (2013.01)

(58) Field of Classification Search
CPC .... H01M 2/166; H01M 2/1686; H01M 4/505; H01M 4/525; H01M 10/0525; H01M 10/0567; H01M 10/4235; H01M 2300/0037

See application file for complete search history.

(56) References Cited

U.S. PATENT DOCUMENTS

| | | |
|---|---|---|
| 2012/0270090 A1 | 10/2012 | Shinohara et al. |
| 2013/0224553 A1* | 8/2013 | Hong .................. H01M 2/1686 429/144 |
| 2014/0205884 A1 | 7/2014 | Wohrle et al. |
| 2014/0308565 A1 | 10/2014 | Lee et al. |
| 2015/0010811 A1 | 1/2015 | Egorov et al. |
| 2015/0111086 A1 | 4/2015 | Arnold et al. |

FOREIGN PATENT DOCUMENTS

| | | | |
|---|---|---|---|
| DE | 10 2013 011 273 | * | 1/2015 |
| EP | 1394888 A1 | | 3/2004 |
| EP | 2871692 A1 | | 5/2015 |
| JP | 2008-016312 A | | 1/2008 |
| JP | 2009283273 A | | 12/2009 |
| JP | 2011-054298 A | | 3/2011 |
| JP | 2011-131470 A | | 7/2011 |
| JP | 2015-018802 A | | 1/2015 |

OTHER PUBLICATIONS

Extended European Search Report dated Aug. 17, 2016 for the corresponding European Patent Application No. 16173066.8.

* cited by examiner

*Primary Examiner* — Laura Weiner
(74) *Attorney, Agent, or Firm* — Troutman Sanders

(57) ABSTRACT

Provided is a lithium ion secondary battery including a positive electrode, a negative electrode, a separator, and an electrolyte solution, in which the separator contains 0.02 to 0.11 wt % of sulfur relative to the weight of the separator.

4 Claims, 1 Drawing Sheet

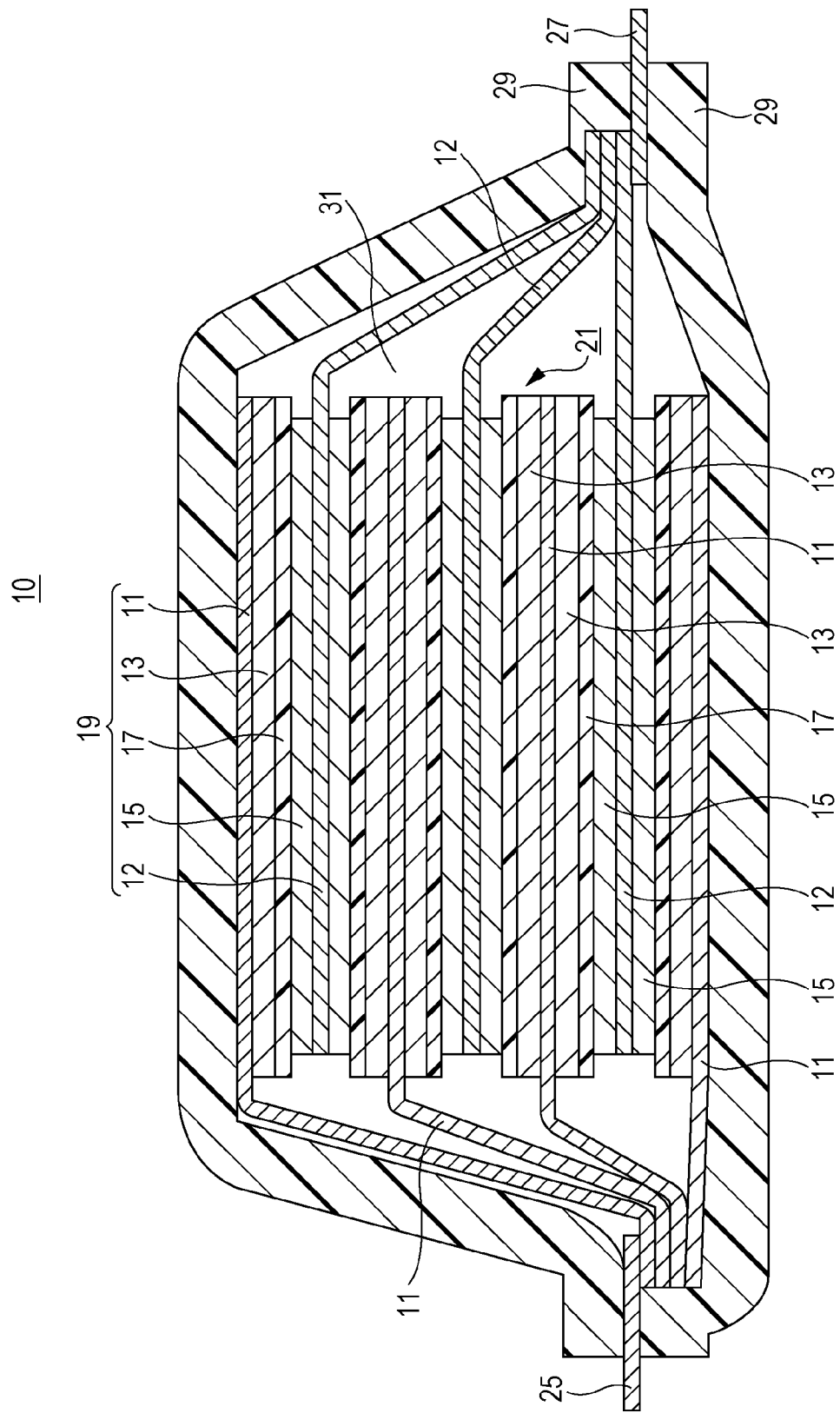

LITHIUM ION SECONDARY BATTERY

CROSS-REFERENCE TO RELATED APPLICATION

This application claims priority from Japanese Patent Application No. 2015-131990 filed with the Japan Patent Office on Jun. 30, 2015, the entire content of which is hereby incorporated by reference.

BACKGROUND

1. Technical Field

The present disclosure relates to nonaqueous electrolyte batteries, particularly to lithium ion secondary batteries.

2. Related Art

Nonaqueous electrolyte batteries have been put into practical use as batteries for vehicles including hybrid vehicles and electric vehicles. Lithium ion secondary batteries have been used as such on-vehicle batteries. As the development of lithium ion secondary batteries has advanced, the batteries have come to have higher capacity. The increase in capacity makes it more important to secure the safety of the battery.

A separator used for a power generation element of a lithium ion secondary battery is formed of a porous film or a microporous film of polyolefin such as polyethylene or polypropylene. In particular, a porous polyethylene film with an effect of increasing the resistance by having pores closed under high temperature, i.e., the so-called shutdown effect is widely used.

In the occurrence of shutdown of the separator, ion flow is stopped (i.e., the separator has higher resistance). In some batteries, however, even if the ion flow is stopped, the reaction between the electrode and the electrolyte becomes intense, in which case the temperature will increase. This causes the short-circuiting inside the battery, making ions start to flow again. The ion flow causes the battery to generate heat, thereby stopping the function of the battery. For preventing such internal short-circuiting secondarily occurring due to the temperature increase in the battery, the separator that has not just the shutdown effect but also the high heat resistance has been demanded.

JP-A-2009-283273 has suggested the separator for a battery, which includes a multilayer porous film having a resin porous film, which mainly includes a resin with the shutdown function, and a heat-resistant porous layer, which mainly includes a heat-resistant microparticle with high heat resistance. The separator disclosed in JP-A-2009-283273 can suppress the deterioration in battery characteristics and improve the safety of the battery.

SUMMARY

A lithium ion secondary battery according to an embodiment of the present disclosure includes: a positive electrode; a negative electrode; a separator; and an electrolyte solution. The separator contains 0.02 to 0.11 wt % of sulfur relative to a weight of the separator.

BRIEF DESCRIPTION OF THE DRAWING

The drawing is a schematic sectional view illustrating a lithium ion secondary battery according to one embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Meanwhile, in the case of mixing a predetermined additive to a nonaqueous electrolyte solution for the purpose of forming a stable film on a surface of an electrode, it may happen that the additive is not optimally consumed for forming the film on the electrode. If it happens, the sufficient formation of the film on the electrode may be failed and in this case, the capacity retention of the battery deteriorates. An objective of the present disclosure is to provide a lithium ion battery having higher safety without decreasing the capacity retention.

A lithium ion secondary battery according to an embodiment of the present disclosure includes a positive electrode, a negative electrode, a separator, and an electrolyte solution. The separator contains 0.02 to 0.11 wt % of sulfur relative to the weight of the separator.

In the lithium ion secondary battery according to the present disclosure, a part of the additive (decomposed substance, etc.) is adsorbed uneasily on the surface of the separator. By taking advantage of this fact, the additive is used to form the film on the electrode surface effectively. This makes it possible to maintain the capacity retention of the battery while improving the safety of the battery.

An embodiment of the present disclosure will be described below. A positive electrode in this embodiment is a battery member with a shape like a thin plate or a sheet. This member includes a positive electrode active material layer formed by applying or rolling a mixture, which includes a positive electrode active material, binder, and if necessary a conductive agent, on a positive electrode current collector such as a metal foil and then drying the mixture. A negative electrode in this embodiment is a battery member with a shape like a thin plate or a sheet. This member includes a negative electrode active material layer formed by applying a mixture, which includes a negative electrode active material, binder, and if necessary a conductive agent, on a negative electrode current collector. The separator is a film-shaped battery member. This member separates between the positive electrode and the negative electrode to secure the conduction of lithium ions between the positive electrode and the negative electrode. The electrolyte solution is an electrically conductive solution obtained by dissolving an ionic substance in a solvent. In this embodiment, particularly a nonaqueous electrolyte solution can be used. The power generation element including the positive electrode, the negative electrode, and the separator constitutes one unit of the battery main components. In general, this power generation element is a stack having the positive electrode and the negative electrode overlapped (stacked) on each other with the separator interposed therebetween. In the lithium ion secondary battery according to the embodiment of the present disclosure, this stack is immersed in the electrolyte solution.

The lithium ion secondary battery according to the embodiment includes the package and the power generation element housed inside the package. Preferably, the power generation element is housed inside the sealed package. Here, "sealed" refers to the state that the power generation element is covered with the package material to be described below so that the power generation element is not exposed to the external air. That is to say, the package has a sealable bag-like shape that can house the power generation element inside.

The separator contains 0.02 to 0.11 wt % of sulfur relative to the weight of the separator. The sulfur contained in the separator may be derived from the additive included in the electrolyte solution to be described below. When the separator contains sulfur by 0.02 to 0.11 wt % relative to the weight of the separator, the battery has higher cycle characteristics.

The negative electrode that can be used in any embodiment includes a negative electrode active material layer including a negative electrode active material disposed on a negative electrode current collector. Preferably, the negative electrode includes the negative electrode active material layer obtained by applying or rolling a mixture, which includes the negative electrode active material, binder, and a conductive agent added as necessary, onto the negative electrode current collector including a metal foil such as a copper foil, and then drying the mixture. In each embodiment, the negative electrode active material preferably includes graphite particles and/or amorphous carbon particles. If a mixed carbon material including both graphite particles and amorphous carbon particles is used, the regeneration performance of the battery is improved.

Graphite is a hexagonal crystal carbon material having the hexagonal-plate-like crystal structure. Graphite is also called black lead or the like. The preferred shape of the graphite is particle. Amorphous carbon may have a structure partly similar to graphite. Amorphous carbon refers to a carbon material that is amorphous as a whole, having a microcrystalline structure forming a network randomly. Examples of the amorphous carbon include carbon black, cokes, activated carbon, carbon fiber, hard carbon, soft carbon, and mesoporous carbon. The preferred shape of the amorphous carbon is particle.

Examples of the conductive agent used as necessary for the negative electrode active material layer include carbon materials, for example, carbon fiber such as carbon nanofiber, carbon blacks such as acetylene black and Ketjen black, activated carbon, mesoporous carbon, fullerenes, and carbon nanotube. Additionally, the negative electrode active material layer may contain additives usually used for forming the electrode, such as thickener, dispersant, and stabilizer.

Examples of the binder used for the negative electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

The positive electrode that can be used in any embodiment includes a positive electrode active material layer including a positive electrode active material disposed on a positive electrode current collector. Preferably, the positive electrode includes the positive electrode active material layer obtained by applying or rolling a mixture, which includes the positive electrode active material, binder, and a conductive agent added as necessary, onto the positive electrode current collector including a metal foil such as an aluminum foil, and then drying the mixture. The positive electrode active material may be a lithium transition metal oxide. Preferred examples of the positive electrode active material include a lithium nickel oxide (for example, $LiNiO_2$), a lithium cobalt oxide (such as $LiCoO_2$), a lithium manganese oxide (such as $LiMn_2O_4$) and a mixture including any of these. Another example of the positive electrode active material is a lithium nickel cobalt manganese composite oxide represented by general formula $Li_xNi_yCo_zMn_{(1-y-z)}O_2$. In the formula, "x" is a numeral satisfying $1 \leq x \leq 1.2$, y and z are positive numerals satisfying $y+z<1$, and y is a numeral of 0.5 or less. Containing more manganese makes it difficult to synthesize a composite oxide with a single phase. In view of this, the relation $1-y-z \leq 0.4$ is desirably satisfied. Further, containing more cobalt results in cost increase and capacity decrease. In view of this, the relations of $z<y$ and $z<1-y-z$ are desirably satisfied. From the viewpoint of achieving the battery with higher capacity, it is particularly preferable that the relations of $y>1-y-z$ and $y>z$ are satisfied. The lithium nickel cobalt manganese composite oxide preferably has a layered crystal structure.

Examples of the conductive agent that may be used for the positive electrode active material layer include carbon materials, for example, carbon fiber such as carbon nanofiber, carbon blacks such as acetylene black and Ketjen black, activated carbon, graphite, mesoporous carbon, fullerenes, and carbon nanotube. In addition, the positive electrode active material layer may contain additives that are usually used for forming the electrode, such as thickener, dispersant, and stabilizer.

Examples of the binder used for the positive electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

A preferred example of the electrolyte solution is a mixture including a linear carbonate and a cyclic carbonate. Examples of the linear carbonate include dimethyl carbonate (hereinafter referred to as "DMC"), diethyl carbonate (hereinafter referred to as "DEC"), di-n-propyl carbonate, di-i-propyl carbonate, di-n-butyl carbonate, di-isobutyl carbonate, and di-t-butyl carbonate. Examples of the cyclic carbonate include propylene carbonate (hereinafter referred to as "PC") and ethylene carbonate (hereinafter referred to as "EC"). The electrolyte solution is obtained by dissolving a lithium salt such as lithium hexafluorophosphate ($LiPF_6$), lithium tetrafluoroborate ($LiBF_4$), or lithium perchlorate ($LiClO_4$) in such a carbonate mixture.

The electrolyte solution may contain an additive in addition to the above components. The preferable additive to be added to the electrolyte solution is the additive that is decomposed electrochemically in the process of charging and discharging the battery to form a film on the electrode or other surface. The particularly preferable additive is the additive that stabilizes the structure of the negative electrode active material layer by forming the film on the surface of the negative electrode active material layer. Examples of such an additive include an additive including a compound containing sulfur in a molecule (hereinafter referred to as "sulfur-containing additive"), for example, cyclic disulfonate (such as methylene methanedisulfonate, ethylene methanedisulfonate, and propylene methanedisulfonate), cyclic sulfonate (such as sultone), chained sulfonate (such as methylenebis(benzenesulfonate), methylenebis(phenylmethanesulfonate), and methylenebis(ethanesulfonate). In addition, the electrolyte solution may include the additive that can form a protective film for the positive electrode and the negative electrode in the process of charging and discharging the battery. Examples of such an additive include vinylene carbonate, vinylethylene carbonate, propylene carbonate methacrylate, and propylene carbonate acrylate. Other examples of the additive include fluoroethylene carbonate, difluoroethylene carbonate, trifluoroethylene carbonate, chloroethylene carbonate, dichloroethylene carbonate, and trichloroethylene carbonate. These additives can prevent the sulfur-containing additive from attacking the positive electrode active material containing a lithium nickel composite oxide. The additive is included in the electrolyte solution by 20 wt % or less, preferably 15 wt % or less, and more preferably 10 wt % or less relative to the weight of the entire electrolyte solution.

In the embodiment, the separator includes an olefin resin layer. The olefin resin layer is a layer containing polyolefin obtained by polymerizing or co-polymerizing α-olefin. Examples of such α-olefin include ethylene, propylene, butene, pentene, and hexene. In the embodiment, the olefin resin layer is preferably a layer with a structure having pores closed when the battery temperature has increased, i.e., porous or microporous polyolefin. With the olefin resin layer having such a structure, the separator is closed (shutdown) upon the increase in battery temperature, thereby stopping the ion flow. In order to achieve the shutdown effect, it is particularly preferable to use the porous polyethylene film.

On the other hand, in another embodiment, the separator preferably includes an olefin resin layer and a heat-resistant microparticle layer including heat-resistant microparticles. The heat-resistant microparticle layer is provided to prevent the function from being stopped by the heat generation from the battery. The heat-resistant microparticle included in the heat-resistant microparticle layer may be a stable inorganic microparticle that resists a temperature of 150° C. or higher and uneasily reacts electrochemically. Examples of such an inorganic microparticle include an inorganic oxide such as silica, alumina (α-alumina, β-alumina, and θ-alumina), iron oxide, titanium oxide, barium titanate, and zirconium oxide, and minerals such as boehmite, zeolite, apatite, kaolin, spinel, mica, and mullite. The separator including the olefin resin layer and the heat-resistant resin layer as above is hereinafter referred to as "ceramic separator".

The battery is assembled using the separator including the olefin resin layer and, in some cases, the heat-resistant microparticle layer, the nonaqueous electrolyte solution formed by mixing electrolyte solution components in predetermined amounts, the positive electrode, the negative electrode, and the package. After that, a predetermined operation including the charging and discharging is performed, so that the battery is finished to be ready for the shipment (pre-shipment state). In the process of charging and discharging the battery, the additive is decomposed through the electrochemical reaction or other chemical reaction and is consumed to form the film on the surface of the electrode. Thus, the amount of each additive in the electrolyte solution is reduced. When the battery is finished to be in the pre-shipment state, a part of the additive (such as a decomposed substance) is adsorbed onto the surface of the separator. Such adsorption of a part of the additive on the surface of the separator does not immediately have an influence on the battery performance. However, the adsorption of the sulfur-containing additive, which is originally added for the purpose of forming the film on the surface of the electrode, on the separator surface reduces the amount of additive which should play the desired rule. As described above, the sulfur-containing additive is added to stabilize the negative electrode (graphite negative electrode in particular) by forming the film on the surface of the negative electrode in particular. However, the adsorption of a part of the additive on the separator surface means the reduction of the film to be formed on the negative electrode by the adsorbed amount. This reduction leads to the shorter cycle lifetime of the battery and the lower capacity retention.

The separator included in the lithium ion secondary battery according to the embodiment contains 0.02 to 0.11 wt % of sulfur relative to the weight of the separator. This indicates that since the adsorption of a part (sulfur) of the sulfur-containing additive on the separator surface uneasily occurs, the sulfur-containing additive is mostly used to fulfil the intended purpose of forming the film on the electrode surface. Examples of such a separator include a separator including a porous or microporous olefin resin layer. Other examples include a ceramic separator including an olefin resin layer and a heat-resistant microparticle layer. When the heat-resistant microparticle included in the heat-resistant microparticle layer is at least one of alumina and boehmite, the heat-resistant microparticle has the excellent thermal stability and the decomposition of the sulfur-containing additive on the separator is effectively prevented. The alumina may be, for example, α-alumina, β-alumina, γ-alumina, or θ-alumina.

If the ceramic separator includes the olefin resin layer and the heat-resistant microparticle layer in the embodiment, a relatively small amount of sulfur-containing additive is decomposed. The sulfur resulting from the decomposition is mainly adsorbed into the heat-resistant microparticle layer. In particular, if the heat-resistant microparticle is alumina or boehmite, almost all the sulfur contained in the separator by 0.02 to 0.11 wt % is absorbed into the heat-resistant microparticle layer.

The ceramic separator including the olefin resin layer and the heat-resistant microparticle layer has the heat-resistant microparticle layer stacked on the surface of the olefin resin layer. The heat-resistant microparticle layer may be formed on only one surface of the olefin resin layer or opposite surfaces thereof. The thickness of the entire heat-resistant microparticle layer may be ⅒ to ½, preferably ⅛ to ⅓, of the thickness of the entire olefin resin layer. With the heat-resistant microparticle layer having too large thickness, the sulfur-containing additive included in the electrolyte solution would be decomposed more to produce more decomposed substance. With the heat-resistant microparticle layer having too small thickness, on the contrary, it is difficult to achieve the effect of improving the heat resistance of the separator as desired.

Here, a structure example of the lithium ion secondary battery according to the embodiment is described with reference to the drawing. The drawing illustrates an example of a cross section of the lithium ion secondary battery. A lithium ion secondary battery 10 includes, as main components, a negative electrode current collector 11, a negative electrode active material layer 13, a separator 17, a positive electrode current collector 12, and a positive electrode active material layer 15. In the drawing, the negative electrode active material layer 13 is provided on each surface of the negative electrode current collector 11. The positive electrode active material layer 15 is provided on each surface of the positive electrode current collector 12. Note that the active material layer may alternatively be formed on only one surface of each current collector. The negative electrode current collector 11, the positive electrode current collector 12, the negative electrode active material layer 13, the positive electrode active material layer 15, and the separator 17 constitute one battery unit, i.e., a power generation element (unit cell 19 in the drawing). The separator 17 may include a heat-resistant microparticle layer and an olefin resin film (neither are shown). A plurality of unit cells 19 is stacked with the separator 17 interposed therebetween. Extension portions extending from the negative electrode current collectors 11 are collected and bonded onto a negative electrode lead 25. Extension portions extending from the positive electrode current collectors 12 are collected and bonded onto a positive electrode lead 27. The positive electrode lead is preferably an aluminum plate and the negative electrode lead is preferably a copper plate. In some cases, the positive electrode lead and the negative electrode lead may be partly coated with another metal (such as nickel, tin, or solder) or a polymer material. The positive electrode lead and the negative electrode lead are welded to the positive electrode and the negative electrode, respectively. The battery including the stacked unit cells is covered with a package 29 with the welded negative electrode lead 25 and positive electrode lead 27 led out of the battery. An electrolyte solution 31 is poured into the package 29. The package 29 has a shape obtained by heat-sealing the periphery of the two stacks.

EXAMPLES

<Manufacture of Negative Electrode>

Surface coated natural graphite powder as the negative electrode active material, carbon black powder as the conductive agent, and styrene butadiene rubber (SBR) and carboxylic methyl cellulose (CMC) as binder resin were added to ion-exchanged water at 93:3:2:2 in a solid content mass ratio. The resulting mixture was stirred to prepare a slurry having these materials dispersed uniformly in water. The slurry was applied onto a 10-μm-thick copper foil to serve as a negative electrode current collector. Next, the electrode was heated for 10 minutes at 125° C. to vaporize water. Thus, the negative electrode active material layer was formed. The negative electrode active material layer was pressed to manufacture the negative electrode having the negative electrode active material layer applied onto one surface of the negative electrode current collector.

<Manufacture of Positive Electrode>

A mixed oxide was used as the positive electrode active material, and the mixed oxide was formed by mixing nickel cobalt lithium manganate (NCM 811, nickel:cobalt:manganese=8:1:1) and lithium manganese oxide ($LiMn_2O_4$) at 25:75 (weight ratio). This mixed oxide, carbon black powder as the conductive agent, and polyvinylidene fluoride as the binder resin were added to a solvent NMP at 90:5:5 in a solid content mass ratio. In addition, oxalic anhydride (molecular weight: 90) as an organic moisture scavenger was added to this mixture by 0.03 parts by mass relative to 100 parts by mass of the solid content of the mixture excluding the NMP. The mixture including oxalic anhydride was stirred to prepare a slurry having these materials dispersed uniformly. The slurry was applied onto a 20-μm-thick aluminum foil as a positive electrode current collector. Next, the electrode was heated for 10 minutes at 125° C., thereby vaporizing NMP. Thus, the positive electrode active material layer was formed. In addition, the positive electrode active material layer was pressed, thereby forming the positive electrode with the positive electrode active material layer applied on one surface of the positive electrode current collector. The positive electrode active material layer has a weight per area of 20 mg/cm² and a density of 3.0 g/cm³.

<Separator>

A ceramic separator includes a 5-μm-thick heat-resistant microparticle layer including alumina as a heat-resistant microparticle, and a 20-μm-thick olefin resin layer including polypropylene. A plurality of ceramic separators was used, and the separators have the heat-resistant microparticle layer containing a different amount of θ-alumina. The kinds of separator used here are shown in Table 1. In Example 3, a 25-μm-thick separator including a single polypropylene layer was used.

<Electrolyte Solution>

A nonaqueous solvent was prepared by mixing ethylene carbonate (hereinafter referred to as "EC") and DEC at EC:DEC=30:70 (volume ratio). To this nonaqueous solvent, lithium hexafluorophosphate ($LiPF_6$) as the electrolyte salt was dissolved at a concentration of 1.0 mol/L. To the obtained nonaqueous solution, additives of methylene methanedisulfonate (MMDS) and vinylene carbonate (VC) were dissolved at a concentration of 1 wt % each relative to the nonaqueous solution. This nonaqueous solution containing the additives was used as the electrolyte solution.

<Manufacture of Lithium Ion Secondary Battery>

A rectangle with a predetermined size was cut out of each of the negative electrode plate and the positive electrode plate manufactured as above. In a portion thereof on which coating was not applied for connecting the terminal, a positive electrode lead terminal made of aluminum was welded with ultrasonic waves. Similarly, a negative electrode lead terminal made of nickel with the same size as the positive electrode lead terminal was welded with ultrasonic waves to a portion of the negative electrode plate on which coating was not applied. The negative electrode plate and the positive electrode plate were disposed on both surfaces of the separator in a state that the active material layers are stacked with the separator interposed therebetween; thus, the electrode plate stack was obtained. Except one long side of the two aluminum laminate films, the other three sides were attached through heat-sealing. Thus, a bag-shaped laminated package was manufactured. Into the laminated package, the electrode stack was inserted. Next, the electrode stack was vacuum impregnated with the electrolyte solution poured into the laminated package. Then, the opening was heat-sealed under reduced pressure. Thus, a stacked lithium ion battery was obtained. The stacked lithium ion battery was subjected to initial charging and discharging. After that, high-temperature aging was performed and thus a stacked lithium ion battery with a battery capacity of 5 Ah was obtained.

<Initial Charging and Discharging>

<The initial charging and discharging were performed under an atmosphere>temperature of 55° C. until the residual battery (hereinafter referred to as state of charge "SOC") becomes 100% from 0%. The charging and discharging were performed under the condition below. First, the constant-current charging (CC charging) is performed at a current of 0.1 C up to 4.1 V, secondly the constant-voltage charging (CV charging) is performed at 4.1 V, and thirdly the constant-current discharging (CC discharging) is performed at a current of 0.1 C to 2.5 V.

<Amount of Sulfur Contained in Separator>

After the initial charging and discharging of the lithium ion secondary battery, the battery was disassembled. The amount of sulfur contained in the separator was measured based on high-frequency inductive coupling plasma optical emission spectrometry (ICP optical emission spectrometry).

<Cycle Characteristic Test>

The manufactured battery was subjected to the cycle test under the following condition: the constant-current constant-voltage charging (CCCV charging) at a current of 1 C and a voltage of 4.15 V and the constant-current discharging (CC discharging) at a current of 1 C were repeated 300 times at 55° C. between an SOC of 0% and an SOC of 100%. The capacity retention was calculated by a formula: (battery capacity after 300 cycles)/(initial battery capacity).

TABLE 1

Evaluation on battery characteristics

| | Kind of separator | Kind of heat-resistant microparticle (θ-alumina content ratio, wt %) | Content amount of sulfur (wt %) | Capacity retention (%) |
|---|---|---|---|---|
| Example 1 | Ceramic separator | Alumina (0) | 0.09 | 80 |
| Example 2 | Ceramic separator | Alumina (6) | 0.11 | 79 |
| Example 3 | Polypropylene single-layer separator | None | 0.02 | 80 |
| Comparative Example 1 | Ceramic separator | Alumina (67) | 0.26 | 60 |
| Comparative Example 2 | Ceramic separator | Aluminum silicate | 0.15 | 65 |

After the cycle characteristic test following the initial charging and discharging, the battery with the separator containing a smaller amount of sulfur has high capacity retention (Examples 1, 2, and 3). It is considered that the sulfur, which is contained in the sulfur-containing additive, is not adsorbed on the separator surface and forms a film effectively on the electrode surface in the process of the initial charging and discharging. In the case of using alumina as the heat-resistant microparticle, the content amount of sulfur changes depending on how much θ-alumina is contained. As θ-alumina is contained more, more sulfur is adsorbed on the separator. In view of this, if alumina is used as the heat-resistant microparticle, it is preferable to use α-alumina, β-alumina, or γ-alumina rather than θ-alumina.

Examples of the embodiment have been described so far but Examples merely represent some examples of the embodiment of the present disclosure. The description of Examples made above is not intended to limit the technical range according to the present disclosure to the particular embodiment or specific structure.

The lithium ion secondary battery according to the present disclosure may be any of the following first to fifth lithium ion secondary batteries.

The first lithium ion secondary battery is a lithium ion secondary battery having a power generation element in a package, the power generation element including: a positive electrode having a positive electrode active material layer disposed on a positive electrode current collector, a negative electrode having a negative electrode active material layer disposed on a negative electrode current collector, a separator, and an electrolyte solution, in which: the separator contains 0.02 to 0.11 wt % of sulfur relative to the weight of the separator.

The second lithium ion secondary battery is the first lithium ion secondary battery, in which the separator includes an olefin resin layer and a heat-resistant microparticle layer.

The third lithium ion secondary battery is the first or second lithium ion secondary battery, in which the sulfur is contained in the heat-resistant microparticle layer.

The fourth lithium ion secondary battery is the first or second lithium ion secondary battery, in which the heat-resistant microparticle is alumina or boehmite.

The fifth lithium ion secondary battery is any of the first to fourth lithium ion secondary batteries, in which the positive electrode active material layer includes a lithium nickel cobalt manganese composite oxide represented by general formula $Li_xNi_yCo_zMn_{(1-y-z)}O_2$ and has a layered crystal structure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
a positive electrode;
a negative electrode;
a separator; and
an electrolyte solution,
wherein the separator contains 0.02 to 0.11 wt % of sulfur relative to a weight of the separator, and
wherein the separator comprises an olefin resin layer and a heat-resistant microparticle layer.

2. The lithium ion secondary battery according to claim 1, wherein the sulfur is contained in the heat-resistant microparticle layer.

3. The lithium ion secondary battery according to claim 1, wherein the heat-resistant microparticle layer includes at least one of alumina and boehmite.

4. The lithium ion secondary battery according to claim 1, wherein a positive electrode active material layer included in the positive electrode includes a lithium nickel cobalt manganese composite oxide having a layered crystal structure and represented by general formula $Li_xNi_yCo_zMn_{(1-y-z)}O_2$ (where "x" is a numeral satisfying $1 \leq x \leq 1.2$, "y" and "z" are positive numerals satisfying y+z<1, and "y" is a numeral of 0.5 or less).

* * * * *